United States Patent
Trunz et al.

(10) Patent No.: US 6,834,163 B2
(45) Date of Patent: Dec. 21, 2004

(54) CAMERA SYSTEM HAVING AT LEAST TWO FIRST CAMERAS AND TWO SECOND CAMERAS

(75) Inventors: Michael Trunz, Ellwangen (DE); Johann Huell, Bohlheim (DE)

(73) Assignee: Z/I Imaging GmbH, Oberkochen (DE)

( * ) Notice: Subject to any disclaimer, the term of this patent is extended or adjusted under 35 U.S.C. 154(b) by 0 days.

(21) Appl. No.: 10/341,454

(22) Filed: Jan. 14, 2003

(65) Prior Publication Data

US 2003/0138247 A1 Jul. 24, 2003

Related U.S. Application Data

(63) Continuation-in-part of application No. PCT/EP01/07693, filed on Jul. 5, 2001.

(30) Foreign Application Priority Data

Jul. 14, 2000 (DE) .......................................... 100 34 601

(51) Int. Cl.[7] ........................ G03B 35/00; G03B 41/00; G03B 39/00; H04N 13/02
(52) U.S. Cl. ........................... 396/325; 396/7; 396/333; 396/335; 348/48; 348/139; 348/144; 348/218.1
(58) Field of Search ........................... 396/325, 324, 396/322, 333, 335, 429, 7; 348/36, 42, 47, 48, 135, 139, 153, 159, 207.99, 211.11, 218.1, 222.1, 264, 335, 144–147; 359/618; 33/20.4

(56) References Cited

U.S. PATENT DOCUMENTS

| 891,013 | A | * | 6/1908 | Smith | ........................... 156/58 |
| 3,518,929 | A | * | 7/1970 | Glenn, Jr. | .................... 396/325 |
| 5,016,109 | A | * | 5/1991 | Gaylord | ................... 348/218.1 |
| 5,475,422 | A | * | 12/1995 | Mori et al. | .................... 348/48 |

* cited by examiner

*Primary Examiner*—Judy Nguyen
*Assistant Examiner*—Rochelle Blackman
(74) *Attorney, Agent, or Firm*—Walter Ottesen

(57) ABSTRACT

The invention relates to a camera system, especially for photogrammetric applications. The camera system contains at least two first cameras (1, 2), which are inclined towards each other so that the optical axes (7, 8) of the first cameras (1, 2) intersect at a common point of intersection (5). The camera system also has at least two second cameras (10, 11) which are located at a distance from the first cameras (1, 2), in the viewing direction of the first cameras (1, 2). The inclination of the optical axes (7, 8) of the first cameras (1, 2) towards each other provides an area (b) in which the envelope that surrounds the acceptance cones of the first cameras (1, 2) has an essentially constant diameter. The second cameras (10, 11) are located in this area (b) so that the second cameras (10, 11) avoid truncating the projection of the visual fields of the first cameras (1, 2). The first cameras are preferably panchromatic and the second cameras polychromatic.

15 Claims, 2 Drawing Sheets

CAMERA SYSTEM HAVING AT LEAST TWO FIRST CAMERAS AND TWO SECOND CAMERAS

RELATED APPLICATION

This application is a continuation-in-part application of European patent application PCT/EP 01/07693, filed Jul. 5, 2001, and claiming priority from German patent application 100 34 601.4, filed Jul. 14, 2000.

FIELD OF THE INVENTION

The invention relates to a camera system for photogrammetrical applications as well as for applications in aerial reconnaissance.

BACKGROUND OF THE INVENTION

Digital cameras are increasingly used in photogrammetry as well as in aerial reconnaissance. On the one hand, there is the desire for a high spatial resolution of the images to be recorded and, on the other hand, the desire for recording color information. Maximum spatial resolution is presently achievable with panchromatic cameras which only make possible the recordation of black/white information.

The space which is available for the entire camera system in aircraft is limited. For this reason, there is the desire to have a compact arrangement of several cameras.

SUMMARY OF THE INVENTION

It is the object of the invention to provide a camera system having at least two first cameras and two second cameras which is configured so as to provide an economic utilization of space.

The camera system of the invention includes at least two first cameras, which each have their own objective. The optical axes of the objectives are inclined to each other. The camera system furthermore includes at least two second cameras which are mounted displaced to these first cameras in the viewing direction of the first cameras.

The optical axes of the objectives of the first cameras are arranged inclined to each other and, as a consequence thereof, these axes intersect. For this reason, the smallest envelope, which surrounds the aperture cones of the first cameras, has a constriction. The second cameras are preferably mounted in the region of this constriction.

In a further advantageous embodiment, at least three first cameras are mounted symmetrically to an axis of symmetry and the second cameras are mounted displaced to the first cameras in the direction of this symmetry axis.

Especially advantageous are a total of four first cameras mounted symmetrically to a symmetry axis. With four cameras, a high image coverage is achieved, that is, a large simultaneously detected angular region.

The first cameras can be panchromatic digital cameras with which the recordation of the topography, which is to be measured, takes place with high lateral resolution but without color information. The second cameras are then designed as multichromatic digital cameras with which also the color information of the passed-over topography is recorded but with reduced lateral resolution.

Preferably, four second cameras are also provided which likewise are mounted symmetrically to the symmetry axis of the first cameras. The optical axes of the second cameras can then be aligned parallel to each other.

For the later photogrammetric evaluation of the image information recorded with the camera system, all aperture cones of the first and second cameras should have a common central overlapping region.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
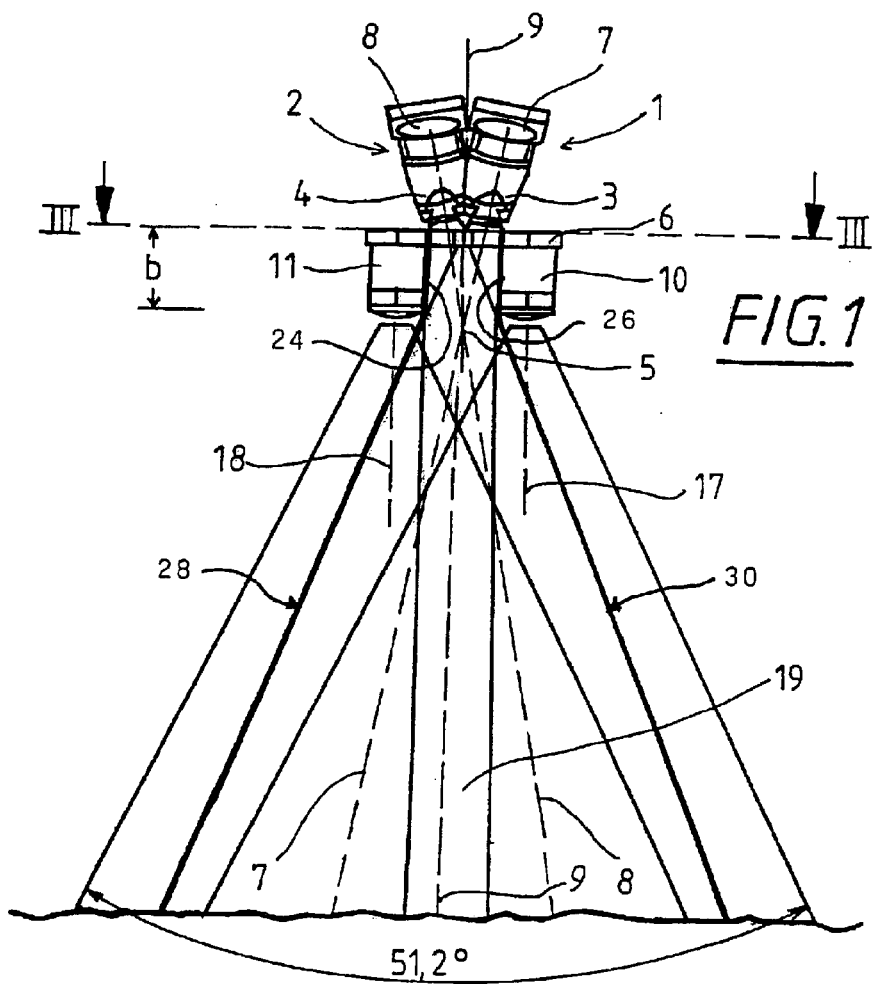
FIG. 1 is a side elevation view of the camera system according to the invention.
Figure 2:
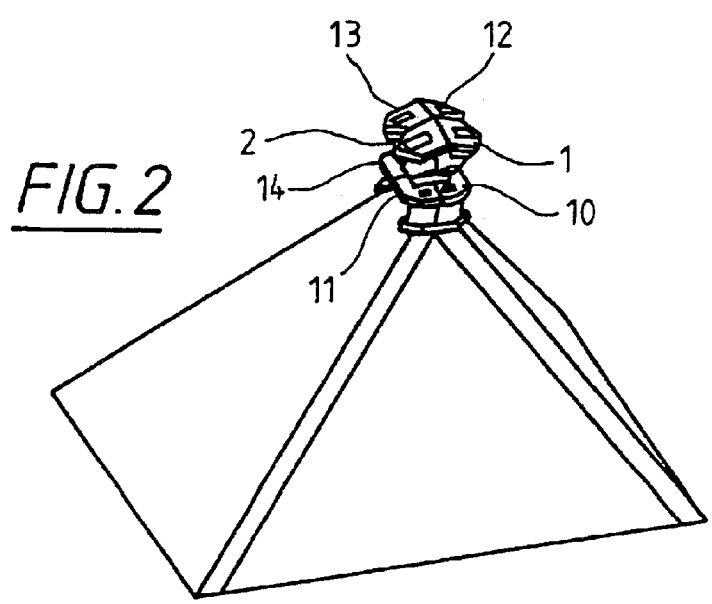
FIG. 2 is a perspective view of the camera system of FIG. 1.
Figure 3:
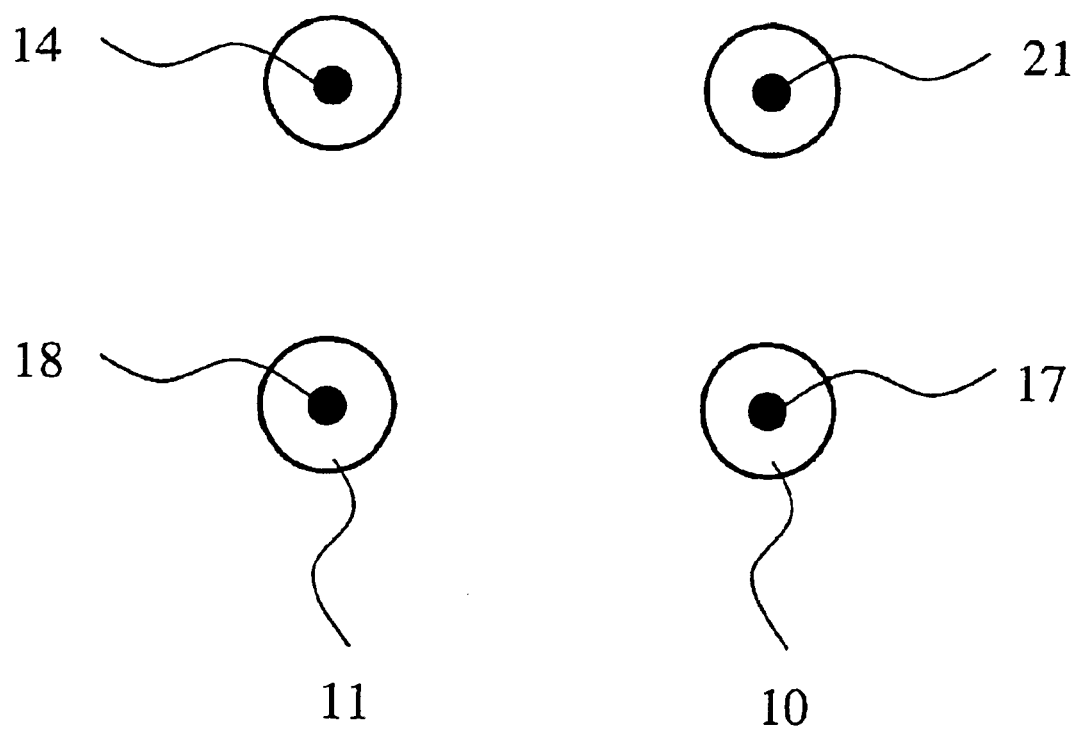
FIG. 3 is a schematic representation of four second cameras viewed in plan of the camera system shown in FIGS. 1 and 2.

The camera system in FIGS. 1 to 3 includes four first cameras (1, 2, 12, 13) and four second cameras (10, 11, 14, 21). The second cameras (10, 11, 14, 21) are mounted displaced with respect to the first cameras (1, 2, 12, 13) in the viewing direction of the first cameras (1, 2, 12, 13). Each of these four first and second cameras includes a housing, an objective mounted in the housing corresponding thereto and a CCD-image sensor mounted behind the objective corresponding thereto. The image sensors (not shown) of the first cameras (1, 2, 12, 13) are panchromatic CCD-image sensors designed for the highest lateral resolution. The CCD-sensors of the second cameras (10, 11, 14, 21) are configured as high-resolution image camera chips.

The four first cameras (1, 2, 12, 13) are mounted symmetrically to a symmetry axis 9. The first cameras (1, 2, 12, 13) are mounted inclined to each other by the same angular amount and relative to the symmetry axis 9 so that the optical axes of the first cameras intersect in a common intersect point 5 which lies on the symmetry axis 9. In FIG. 1, only two of these optical axes (7, 8) are shown.

Because of the mutually inclined arrangement of the first cameras (1, 2), there arises a region (b) directly ahead of the objectives (3, 4) of the first cameras wherein the smallest envelope, which encloses the aperture cones of the first cameras, has a constriction in the lateral direction, that is, in a direction perpendicular to the symmetry axis 9. This constricted region is schematically represented by the vertical segments (24, 26) of the heavy solid lines (28, 30). In this region (b), the diameter of the envelope, which encloses the aperture cones of the first cameras (1, 2, 12, 13), is constant. The second cameras (10, 11, 14, 21) are mounted in such a manner that the aperture cones of the first cameras (1, 2, 12, 13) are not cropped by the housings of the second cameras (10, 11, 14, 21). The support structure 6 for the second cameras (10, 11, 14, 21) has, for this purpose, a correspondingly large opening for the clear passage of the aperture cones of the first cameras.

The envelope indicated by the solid heavy lines 28 and 30 defines the composite aperture cone of the first cameras (1, 2, 12, 13). This composite aperture cone has a constant diameter only in region (b) and the envelope therefore has a shape corresponding to an inverted funnel.

The optical axes of the second cameras are aligned parallel to the symmetry axis 9. In FIG. 1, only the optical axes (17, 18) of second cameras (10, 11), respectively, are shown.

In a central region 19, the aperture cones of all first cameras (1, 2, 12, 13) and second cameras (10, 11, 14, 21) overlap.

The objectives of the first cameras are so designed that each of the first cameras records an image angle of at least 20°. In FIG. 1, the objectives (3, 4) of first cameras (1, 2) are shown. The relative inclination of the first cameras to each other is so selected that all first cameras together include an image angle of over 40° in two mutually perpendicular directions perpendicular to the symmetry axis 9.

The objectives of the second cameras (10, 11, 14, 21) are so designed that all second cameras, in common, include an image angle of over 50° in two mutually perpendicular directions perpendicular to the symmetry axis 9.

With the camera system of the invention, an optimal compact arrangement of the individual cameras is achieved. The unified viewing field of the first cameras as well as of the second cameras ensures a 100% ground coverage, that is, there is no non-included or non-detected angular region between the individual aperture cones.

Because of the compact configuration and the resulting minimal need for space, the arrangement of the cameras according to the invention ensures also a high stability with respect to vibrations and temperature behavior as a consequence of the short distances of the individual cameras with respect to each other.

In the embodiment described, the distances of the first cameras with respect to each other are greater than the distances of the second cameras with respect to each other.

It is understood that the foregoing description is that of the preferred embodiments of the invention and that various changes and modifications may be made thereto without departing from the spirit and scope of the invention as defined in the appended claims.

What is claimed is:

1. A camera system comprising:
   at least two first cameras having respective first objectives defining a viewing direction;
   said first objectives defining respective optical axes inclined toward each other; and,
   at least two second cameras having mutually parallel optical axes and being mounted in the direction of said viewing direction in spaced relationship to said first cameras.

2. The camera system of claim 1, wherein said first cameras conjointly define a composite aperture cone delimited by an imaginary envelope having a funnel-like configuration with a constricted portion of constant diameter extending in said viewing direction; and, said second cameras are mounted in the region of said constricted portion.

3. The camera system of claim 2, wherein said camera system defines a symmetry axis; said first cameras are three in number and the three first cameras are arranged symmetrically with respect to said symmetry axis; and, said second cameras are mounted displaced to said first cameras.

4. The camera system of claim 3, wherein said first cameras are four in number.

5. The camera system of claim 4, wherein aid first cameras are panchromatic cameras.

6. The camera system of claim 5, wherein said second cameras are multichromatic cameras.

7. The camera system of claim 6, wherein said second cameras are four in number.

8. The camera system of claim 7, wherein said second cameras are mounted symmetrically to said symmetry axis.

9. The camera system of claim 1,
   wherein said second cameras have respective objectives defining respective axes aligned parallel to each other.

10. The camera system of claim 1, wherein said first cameras define a first composite aperture cone and said second cameras define a second composite aperture cone; and, said first and second composite aperture cones have a common overlapping region.

11. A camera system comprising:
    at least two first cameras having first and second aperture cones and having respective first objectives defining a viewing direction;
    said first objectives defining respective optical axes inclined toward each other so as to intersect causing said aperture cones to define a constriction;
    at least two second cameras mounted in the region of said constriction in the direction of said viewing direction in spaced relationship to said first cameras; and,
    wherein said first cameras take black/white pictures and said second cameras take color pictures.

12. A camera system for photogrammatical and aerial reconnaissance applications, the camera system comprising:
    at least two first cameras mounted at a first elevation and having respective first objectives defining a viewing direction;
    said first objectives defining respective optical axes inclined toward each other;
    at least two second cameras mounted at a second elevation below said first elevation in the direction of said viewing direction in spaced relationship to said first cameras;
    said first cameras conjointly defining a composite aperture cone delimited by an imaginary envelope having a funnel-like configuration with a constricted portion of constant diameter extending in said viewing direction;
    said second cameras being mounted in the region of said constricted portion; and,
    wherein said first cameras take black/white pictures and said second cameras take color pictures.

13. A camera system for photogrammatical and aerial reconnaissance applications, the camera system comprising:
    at least two first cameras mounted at a first elevation and having respective first objectives defining a viewing direction;
    said first objectives defining respective optical axes inclined toward each other;
    at least two second cameras mounted at a second elevation below said first elevation in the direction of said viewing direction in spaced relationship to said first cameras;
    said first cameras conjointly defining a composite aperture cone delimited by an imaginary envelope having a funnel-like configuration with a constricted portion of constant diameter extending in said viewing direction;
    said second cameras being mounted in the region of said constricted portion; and,
    wherein said first cameras take panchromatic black/white pictures and said second cameras take additional pictures to produce color information.

14. A camera system comprising:
    at least two first cameras having respective first objectives defining a viewing direction;
    said first objectives defining respective optical axes inclined toward each other; and,
    at least two second cameras mounted in the direction of said viewing direction in spaced relationship to said first cameras,
    wherein said second cameras have respective objectives defining respective axes aligned parallel to each other.

15. The camera system of claim 11, wherein said black/white pictures are panchromatic black/white pictures and said color pictures are additional pictures to produce color information.

* * * * *

UNITED STATES PATENT AND TRADEMARK OFFICE
CERTIFICATE OF CORRECTION

PATENT NO. : 6,834,163 B2
DATED : December 21, 2004
INVENTOR(S) : Michael Trunz and Johann Huell It is certified that error appears in the above-identified patent and that said Letters Patent is hereby corrected as shown below:

Column 3,
Line 48, delete "aid" and substitute -- said -- therefor.

Column 4,
Lines 9 and 29, delete "photogrammatical" and substitute -- photogrammetrical -- therefor.

Signed and Sealed this

Third Day of May, 2005

JON W. DUDAS
*Director of the United States Patent and Trademark Office*